May 3, 1955 P. L. O'DONNELL 2,707,318
ADHESIVE COATED BINDING TAPE
Filed Oct. 1, 1952
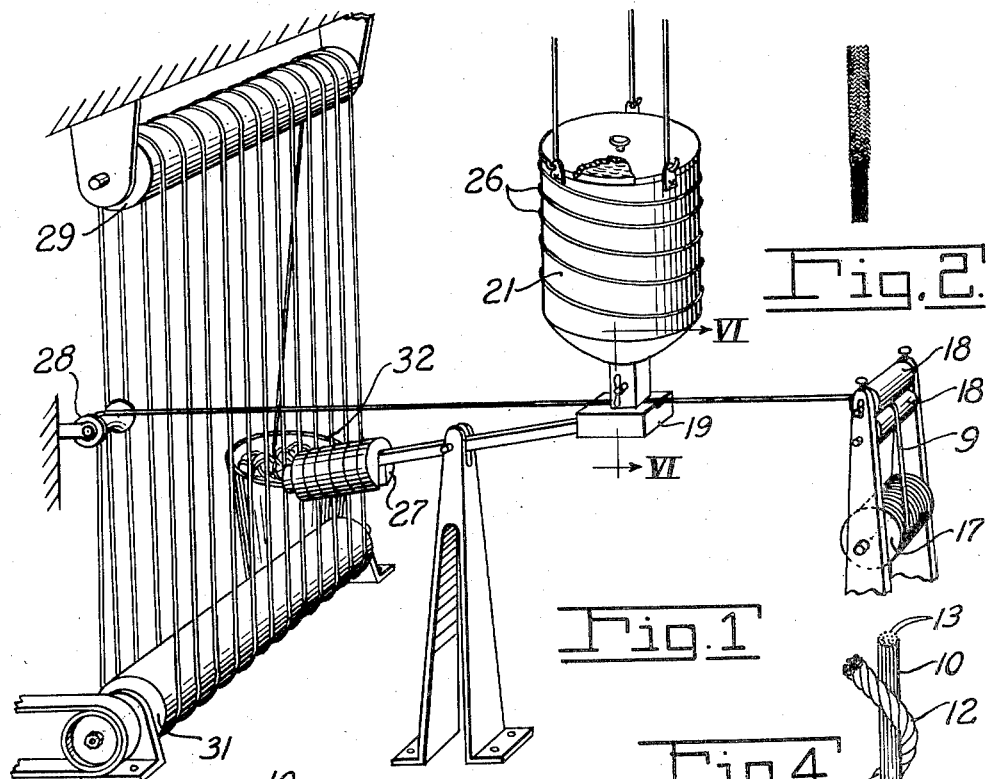
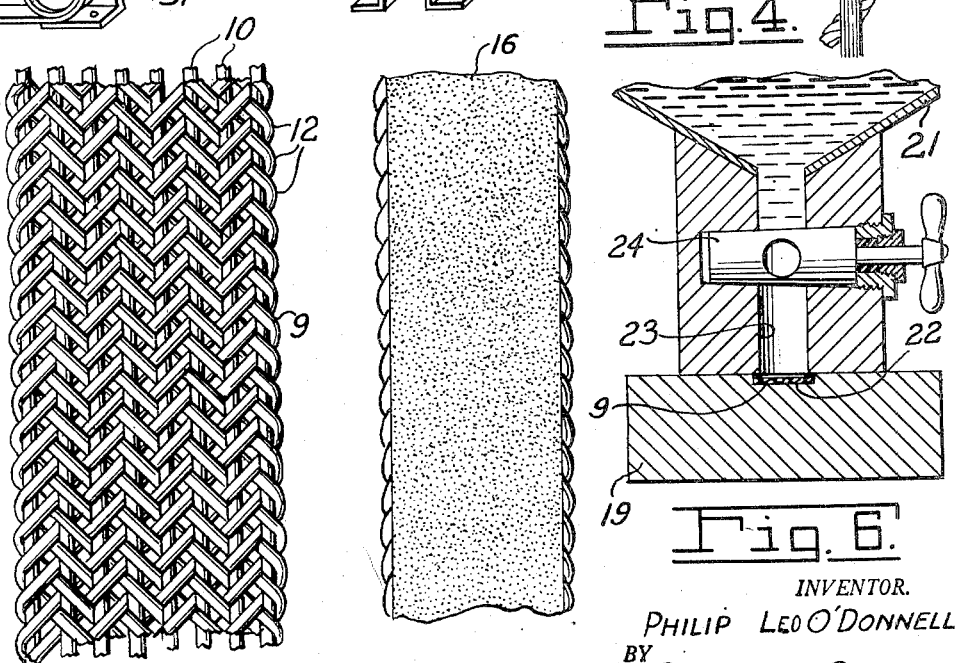
INVENTOR.
PHILIP LEO O'DONNELL
BY
Zugelter & Zugelter
Attys.

United States Patent Office 2,707,318
Patented May 3, 1955

2,707,318

ADHESIVE COATED BINDING TAPE

Philip Leo O'Donnell, Norwood, Ohio

Application October 1, 1952, Serial No. 312,476

1 Claim. (Cl. 28—74)

This invention relates to a binding tape having a coating of adhesive on a surface thereof and more particularly to a prestressed binding tape of great strength having been stressed while the adhesive was being applied and to a method of making such a binding tape.

An object of this invention is to provide a prestressed binding tape having a coating of adhesive on a surface thereof, whereby the binding tape may be secured to shoes and the like.

A further object of this invention is to provide a binding tape having glass fibres extending lengthwise thereof and cross-threads interwoven with the glass fibres on which an adhesive coating is applied while the glass fibres of the tape are stressed in tension, whereby the glass fibres are held substantially straight and taut as the adhesive is applied to the tape, adhesive holding the cross-threads tightly around the stressed glass fibre threads and thereby enhancing the strength of the tape.

A further object of this invention is to provide a method for forming a prestressed tape having on one face thereof a coating of adhesive.

The above and other objects and features of the invention will in part be apparent and will in part be obvious from the following detailed description, and the drawing: in which:

Fig. 1 is a more or less diagrammatic view in perspective, partly in section, of apparatus for manufacturing prestressed binding tape in accordance with an embodiment of this invention;

Fig. 2 is a plan view showing the tape partly coated with adhesive;

Fig. 3 is an enlarged plan view showing the tape prior to the application of adhesive;

Fig. 4 is an enlarged plan view showing details of construction of the threads of the tape illustrated in Fig. 3;

Fig. 5 is a plan view showing the tape in completed form with an adhesive coating thereon; and Fig. 6 is a partial view in vertical section taken on line VI—VI of the adhesive applying mechanism of the machine illustrated in Fig. 1.

In the following detailed description, and the drawing, like reference characters indicate like parts.

The binding tape of this invention is formed from a tape or ribbon 9 of the type shown in Figs. 3 and 4. As shown in Fig. 3, the tape includes a plurality of substantially parallel threads 10 and cross threads 12 interwoven with the substantially parallel threads. As shown in Fig. 4, each of the parallel threads 10 is made up of a plurality of elongated fibres 13 arranged in roves. The fibres 13 are preferably glass fibres. The cross threads, as shown in Fig. 4, are twisted threads and may be formed of cotton, linen, or the like, or other material which can be penetrated by the adhesives used in forming the tape.

One side of the tape 9 is coated with an adhesive 16, as shown in Fig. 5. The adhesive is an appropriate thermoplastic adhesive which penetrates the cross threads and draws the cross threads tightly together around the glass fibre roves 10. The adhesive coating may be balata or gutta-percha.

The tape is stressed in tension while the adhesive is being applied to it. In Fig. 1 is shown machinery for prestressing the fibres 10 and applying the adhesive. The ribbon 9 is fed from a reel 17 through a pair of pinch rollers 18. The rollers 18 are held tightly against the ribbon 9 and serve as a drag or brake on the tape so that the tape on the discharge side of the rollers 18 is under tension. The tape passes from rollers 18 through a guide block 19 where adhesive is applied. The adhesive is applied from a tank 21. As shown in Fig. 6, the guide block 19 is provided with a guide groove 22 through which the ribbon 9 passes. The tape passes between a guide groove 22 and a liquid applying nozzle 23, which is slightly narrower than the tape and centered above groove 22 so that a coating of adhesive is applied to the tape which is slightly narrower than the width of the tape and coats one face thereof. The adhesive is fed from tank 21 through a valve 24 (Fig. 6). Valve 24 may be turned to shut off the flow of adhesive when the machine is not in operation. The tank 21 is provided with heating coils 26 whereby the adhesive may be heated and maintained in the proper condition of fluidity.

Guide block 19 is held against the nozzle 23 by means of a weight 27 which holds the block and the tape firmly but yieldingly against the adhesive applying nozzle.

From the adhesive applying nozzle, the tape passes over an idle roll 28 to a pair of spaced tape drying rollers 29 and 31 over which the tape passes as the adhesive drys. From the rollers 29 and 31 the tape passes to a collecting basket or receptacle 32. As the tape passes over rollers 29 and 31 the adhesive drys and sets. When a sufficient amount of tape has collected in basket 32, the basket may be removed so that the tape therein can be wound on appropriate rolls or the like (not shown).

The adhesive holds the cross threads firmly about the parallel threads so that the parallel threads are maintained in their prestressed condition and the tape has tremendous strength in a direction lengthwise thereof. In addition, the adhesive prevents displacement of the parallel threads along the length of the tape.

When the tape is to be applied to the shoe, the tape may be heated sufficiently to make the adhesive adhere to the material of the shoe and the adhesive may be used for applying the tape to the edge of the shoe for strengthening the edge.

The tape and method for making the tape which are described above, are subject to modification without departing from the spirit or scope of the appended claim.

Having described my invention, what I claim as new and desire to secure by Letters Patent, is:

A method of forming prestressed inelastic binding tape which comprises stressing in tension a ribbon consisting of a plurality of substantially parallel threads of glass fibre and cross-threads interwoven with the parallel threads extending crosswise of the parallel threads to hold the parallel threads taut and substantially parallel, coating one side of the ribbon while the ribbon is stressed in tension with a fluid thermoplastic adhesive capable of penetrating the cross threads so that the adhesive penetrates the cross threads to draw the cross threads tightly around the parallel threads and holds the parallel threads in a taut condition in the tape, and drying the adhesive while the ribbon is held in tension.

References Cited in the file of this patent

UNITED STATES PATENTS

| 232,122 | Hammesfahr | Sept. 14, 1880 |
| 1,758,610 | Lang | May 13, 1930 |
| 2,132,702 | Simpson | Oct. 11, 1938 |
| 2,145,235 | Cryor | Jan. 31, 1939 |
| 2,230,271 | Simpson | Feb. 4, 1941 |
| 2,372,983 | Richardson | Apr. 3, 1945 |
| 2,385,319 | Eustis | Sept. 18, 1945 |
| 2,539,301 | Foster | Jan. 23, 1951 |
| 2,635,670 | Winberg | Apr. 21, 1953 |